United States Patent
Hirshberg et al.

(10) Patent No.: US 12,088,712 B2
(45) Date of Patent: Sep. 10, 2024

(54) SYSTEM AND METHOD FOR ENCRYPTING MEMORY TRANSACTIONS

(71) Applicant: Mellanox Technologies Ltd., Yokneam (IL)

(72) Inventors: Eitan Hirshberg, Yokneam (IL); Boris Pismenny, Yokneam (IL); Miriam Menes, Yokneam (IL); Eilon Greenstein, Yokneam (IL)

(73) Assignee: Mellanox Technologies Ltd., Yokneam (IL)

( * ) Notice: Subject to any disclaimer, the term of this patent is extended or adjusted under 35 U.S.C. 154(b) by 339 days.

(21) Appl. No.: 17/699,517

(22) Filed: Mar. 21, 2022

(65) Prior Publication Data
US 2023/0299956 A1 Sep. 21, 2023

(51) Int. Cl.
*H04L 9/08* (2006.01)

(52) U.S. Cl.
CPC .......... *H04L 9/0891* (2013.01); *H04L 9/0822* (2013.01)

(58) Field of Classification Search
CPC ....... H04L 9/0891; H04L 9/0822; H04L 9/14; G06F 21/606; G06F 21/78; G06F 21/602
See application file for complete search history.

(56) References Cited

U.S. PATENT DOCUMENTS

| | | | | |
|---|---|---|---|---|
| 6,021,198 A * | 2/2000 | Anigbogu | ............... | H04L 69/04 367/60 |
| 7,380,130 B2 * | 5/2008 | England | ............... | G06F 21/445 713/176 |
| 7,739,381 B2 * | 6/2010 | Ignatius | ............... | G06F 21/602 709/225 |
| 2003/0200435 A1 * | 10/2003 | England | ............... | G06F 21/57 713/172 |
| 2006/0139681 A1 * | 6/2006 | Walmsley | ............ | G06F 21/606 358/1.14 |
| 2006/0218314 A1 * | 9/2006 | Kawabe | ............ | H04N 21/8456 710/33 |
| 2008/0037777 A1 * | 2/2008 | Ignatius | ............... | H04L 9/0894 380/44 |
| 2013/0086393 A1 * | 4/2013 | Pogmore | ................. | G06F 16/81 713/189 |
| 2013/0103777 A1 * | 4/2013 | Kagan | ................... | H04L 49/901 709/212 |
| 2014/0068704 A1 * | 3/2014 | Grewal | .................... | G06F 21/78 726/4 |
| 2015/0281297 A1 * | 10/2015 | Chamberlin | ........ | G06F 12/1408 709/219 |
| 2015/0358302 A1 * | 12/2015 | Noguchi | ............... | G06F 21/606 713/171 |
| 2016/0203479 A1 * | 7/2016 | Durant | ............... | G06Q 20/3829 705/71 |
| 2023/0299956 A1 * | 9/2023 | Hirshberg | ............ | H04L 9/0891 380/28 |

* cited by examiner

*Primary Examiner* — J. Brant Murphy
(74) *Attorney, Agent, or Firm* — PEARL COHEN ZEDEK LATZER BARATZ LLP

(57) ABSTRACT

A method of encrypting a memory transaction include, using a computing device operating a processor, encrypting a set of buffers to be transmitted, each buffer encrypted using an encryption key of a set of encryption keys.

16 Claims, 3 Drawing Sheets

SYSTEM AND METHOD FOR ENCRYPTING MEMORY TRANSACTIONS

FIELD OF THE INVENTION

The present invention relates to the field of methods of accessing a memory of a computing device, and more particularly, to methods of encrypting data in memory transactions.

BACKGROUND OF THE INVENTION

Encryption of data in a memory transaction between two or more computing devices is typically connection-based, meaning that all data being transmitted during memory transactions is encrypted using the same encryption key. However, using the same encryption key for all memory transactions may, for example, lead to a single point failure, e.g., if the encryption key is broken.

SUMMARY OF THE INVENTION

Some embodiments may encrypt a memory transaction by, using a computing device operating a processor, encrypting a set of buffers to be transmitted, each buffer encrypted using an encryption key of a set of encryption keys. Some embodiments may include transmitting the encrypted buffers. Each encryption key in the set of encryption keys may be different from the other encryption keys in the set of encryption keys.

Some embodiments may include: associating each of one or more of encryption keys in the set of encryption keys with a buffer in the set of buffers; and encrypting a buffer in the set of buffers using the encryption key of the set of encryption keys associated with the respective buffer.

Some embodiments may include: defining a set of instructions indicating an order of buffers in the set of buffers to be transmitted; and based on the set of instructions, encrypting the buffers and transmitting the encrypted buffers. The set of instructions may include a set of pointers, each pointer to a buffer in the set of buffers, and a set of indexes, each index to an encryption key in the set of encryption keys. Some embodiments may include defining the set of instructions such that each index of the set of indexes is followed by a pointer of the set of pointers.

Some embodiments may include: associating each of one or more of encryption keys in the set of encryption keys with a buffer in the set of buffers; based on the association, determining whether or not an encryption key in the set of encryption keys is associated with a buffer in the set of buffers; and if the encryption key is associated with the buffer, encrypting the buffer using the encryption key.

Some embodiments may include: receiving the encrypted buffers; based on metadata accompanying the encrypted buffers, determining encryption keys of the set of encryption keys to be used to decrypt the encrypted buffers; and decrypting the encrypted buffers using the encryption keys.

Some embodiments may provide a device including: a memory; and a processor to encrypt a set of buffers to be transmitted, each buffer encrypted using an encryption key of a set of encryption keys. In some embodiments, the processor may transmit the encrypted buffers. In some embodiments, each encryption key in the set of encryption keys is different from the other encryption keys in the set of encryption keys.

In some embodiments the processor may: define a set of instructions indicating an order of buffers in the set of buffers to be transmitted and encryption keys of the set of encryption keys to be used to encrypt the buffers; and based on the set of instructions, encrypt the buffers and transmit the encrypted buffers. In some embodiments, the set of instructions may include: a set of pointers, each pointer to a buffer in the set of buffers, and a set of indexes, each index to an encryption key in the set of encryption keys. In some embodiments, the processor may define the set of instructions such that each index of the set of indexes is followed by one pointer of the set of pointers.

In some embodiments, the processor may: associate each of one or more of encryption keys in the set of encryption keys with a buffer in the set of buffers; based on the association, determine whether or not an encryption key in the set of encryption keys is associated with a buffer in the set of buffers; and if the encryption key is associated with the buffer, encrypt the buffer using the encryption key.

In some embodiments, the processor may: receive the encrypted buffers; based on metadata accompanying the encrypted buffers, determine encryption keys of the set of encryption keys to be used to decrypt the encrypted buffers; and decrypt the encrypted buffers using the encryption keys.

Some embodiments may provide a method of encrypting a memory transaction including, using a computing device operating a processor: associating each encryption key in a set of encryption keys with one buffer in a set of buffers; and encrypting a buffer of the set of buffers using an encryption key of the set of encryption keys associated with the buffer. Some embodiments may include transmitting the encrypted buffer.

Some embodiments may include: receiving the encrypted buffer; based on metadata accompanying the encrypted buffer, determining an encryption key of the set of encryption keys to be used to decrypt the encrypted buffer; and decrypt the encrypted buffer using the encryption keys.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1:
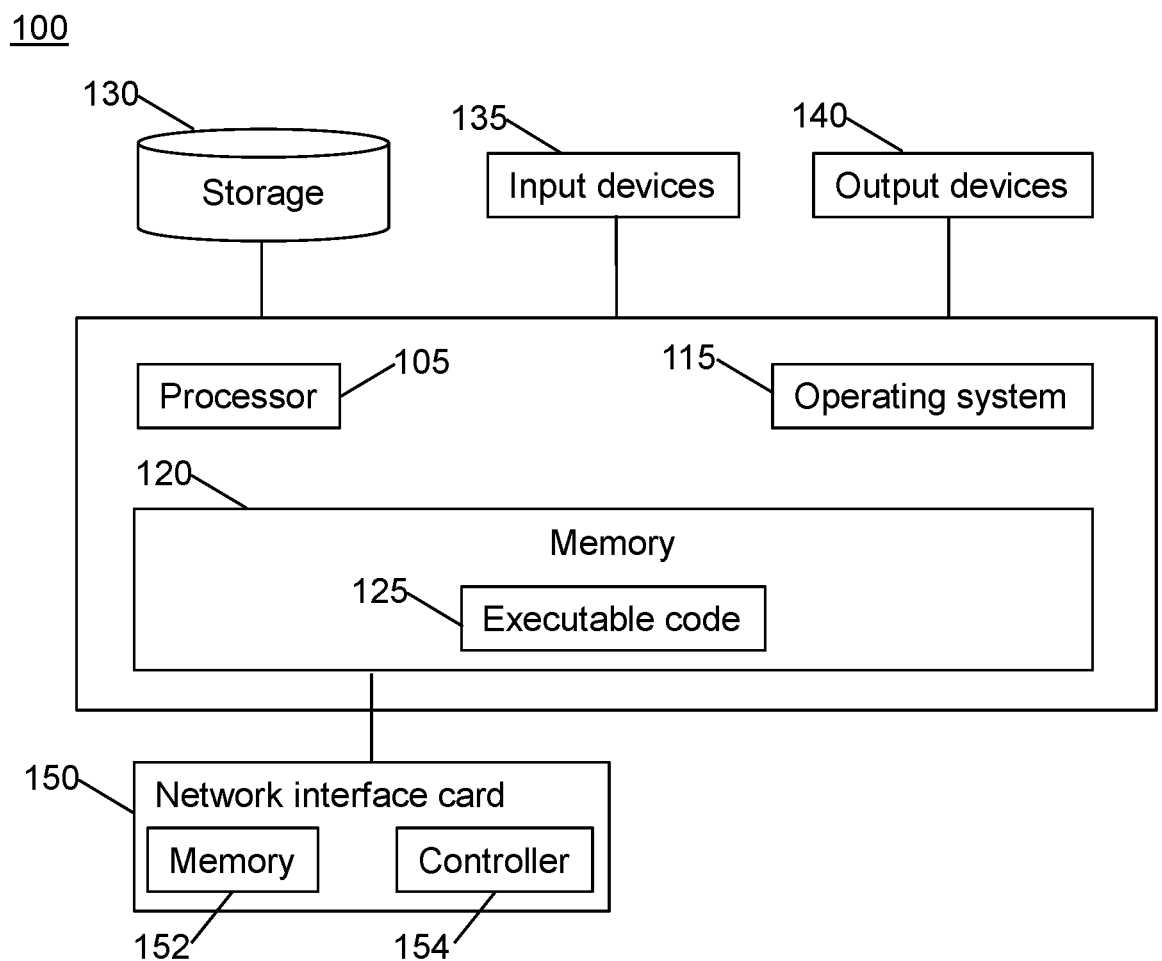
FIG. 1 is a block diagram of an exemplary computing device which may be used with embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the present invention may improve encrypting data in a memory transaction between computing devices. In operation, a set of buffers to be transmitted in a memory transaction are encrypted such that each buffer of the set of buffers is encrypted using an encryption key (typically a different encryption key, one for each buffer) of a set of encryption keys. Different buffers may be encrypted using different encryption keys. Embodiments of the present invention may be utilized in, e.g., remote direct memory access (RDMA) operations providing direct memory access from a memory of one computing device into a memory of another computing device (the devices typically connected by a network), possibly without involving an operating system of neither of the computing devices. Since RDMA is running in hardware (e.g., without involving an operating system of computing devices), utilizing embodiments of the present invention in RDMA applications may eliminate a need in encrypting memory transactions in software and thus increasing the efficiency of encryption and memory transactions. Embodiments of the present invention may be also utilized in other memory access operations rather than in RDMA operations, and in other data transmission contexts, other than memory transactions.

Reference is now made to FIG. 1, which is a block diagram of an exemplary computing device which may be used with embodiments of the present invention.

Figure 2:
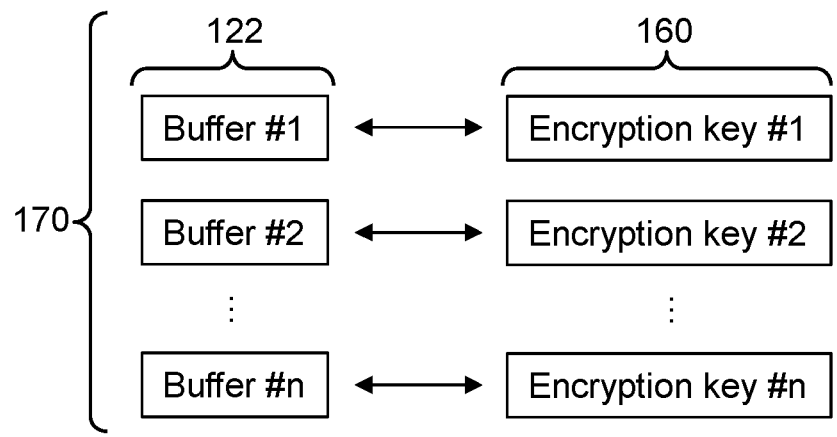
FIG. 2 is a schematic illustration of association data associating different encryption keys with different buffers registered in a memory of the computing device, according to some embodiments of the invention.

Reference is also made to FIG. 2, which is a schematic illustration of association data associating different encryption keys with different buffers registered in a memory of the computing device, according to some embodiments of the invention.

Figure 3:
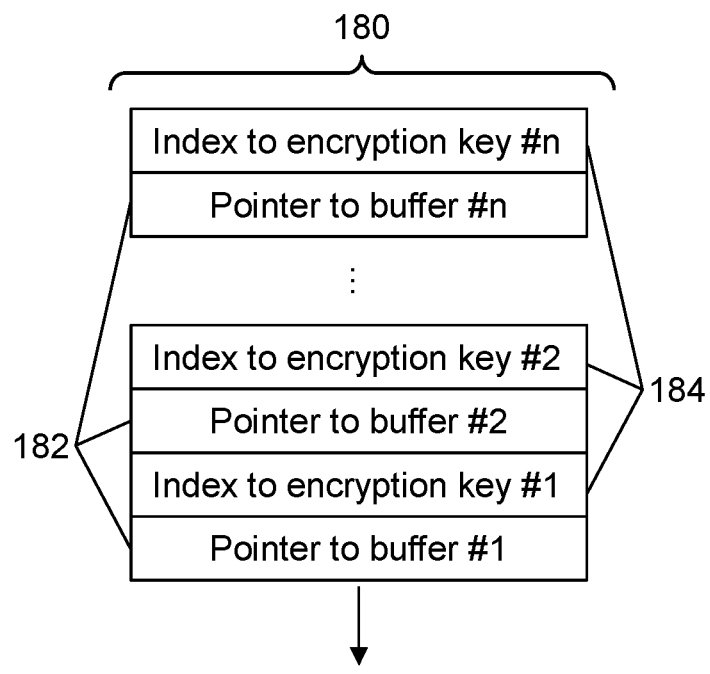
FIG. 3 is a schematic illustration of a set of instructions indicating an order of buffers to be transmitter, according to some embodiments of the invention.

Reference is also made to FIG. 3, which is a schematic illustration of a set of instructions indicating an order of buffers to be transmitter, according to some embodiments of the invention.

Computing device 100 of FIG. 1 may include a processor 105 that may be, for example, a central processing unit processor (CPU), a chip or any suitable computing or computational device, an operating system 115, a memory 120, a storage 130, input devices 135 and output devices 140.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different, memory units. Memory 120 may store for example, instructions to carry out a method (e.g., code 125), and/or data such as user responses, interruptions, etc.

Executable code 125 may be any executable code, e.g., an application, a program, a process, task or script. Executable code 125 may be executed by processor 105 possibly under control of operating system 115. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processors 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card, a modem, printer or facsimile machine, a universal serial bus (USB) device or external hard drive may be included in input devices 135 and/or output devices 140.

Embodiments of the invention may include one or more articles (e.g., memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Embodiments of the present invention related to encryption of data during memory transactions may be utilized in RDMA operations providing a direct memory access from a memory of one computing device into a memory of another computing device in a network without involving an operating system of neither of the computing devices. In various embodiments, computing device 100 may include or may be connected to a network interface card (NIC) 150. NIC 150 may carry out RDMA operations from memory 120 of computing device 100 into a memory of another computing device in a network without involving an operating system of neither of the computing devices. NIC 150 may carry out encryption of memory transactions according to some embodiments of the present invention as described herein. Computing devices other than NIC 150 may be configured to carry out the embodiments of the present invention. For example, graphical processing units, tensor processing units or other computing devices known in the art, carry out the embodiments of the present invention. Embodiments of the present invention may be also utilized in memory access operations other than in RDMA operations.

NIC 150 may use or register a set of buffers 122 in memory 120 of computing device 100, define a set of encryption keys 160, and generate association data 170 associating each of one or more of encryption keys in set of encryption keys 160 with one buffer in set of buffers 122 (e.g., as schematically shown in FIG. 2). In some embodiments, each encryption key in set of encryption keys 160 may be different from the other encryption keys in set of encryption keys 160. The buffers may include, for example, computer data to be transferred between memories of different computers, or in other contexts, other types of data.

NIC 150 may define a set of instructions 180 indicating an order of buffers in set of buffers 122 to be transmitted. In some embodiments, set of instructions 180 may include a set of pointers 182, each pointer to a buffer in set of buffers 122, and a set of indexes 184, each index to an encryption key in set of encryption keys 160. For example, in set of instructions 180, each index of set of indexes 184 may be followed by a pointer of set of pointers 182 (e.g., as schematically shown in FIG. 3). For example, a driver of NIC 150 may settle the order of buffers based on work requests received at the NIC driver from higher layers of NIC software.

Association data 170 and set of instructions 180 may be defined for each of the two computing devices exchanging data therebetween.

NIC 150 may encrypt set of buffers 122 using set of encryption keys 160 based on association data 170 and/or set of instructions 180. In some embodiments, NIC 150 may encrypt each buffer in set of buffers 122 or data contained in the respective buffer according to set of instructions 170 using an encryption key of set of encryption keys 160 associated with the respective buffer. NIC 150 may further transmit (e.g., to another computing device in the network) the encrypted buffers or the encrypted data from the buffers.

In some embodiments, NIC 150 may determine, based on association data 170 and/or set of instructions 180, whether or not an active encryption key (e.g., which may be a specific encryption key to be used to encrypt a specific buffer) is associated with a buffer to be transmitted. If it is determined that the active encryption key is associated with the buffer to be transmitted, NIC 150 may encrypt the respective buffer or data contained in the respective buffer using the active encryption key and transmit the encrypted buffer or the encrypted data from the respective buffer. If it is determined that the active encryption key is not associated with the buffer to be transmitted, NIC 150 may set the active encryption key to an encryption key that is associated with the respective buffer (e.g., based on association data 170 and/or set of instructions 180), encrypt the respective buffer or data contained in the respective buffer using the newly set active encryption key, and transmit the encrypted buffer or the encrypted data from the respective buffer.

NIC 150 may transmit each of the encrypted buffers or encrypted data together with metadata (typically the metadata is unencrypted), the metadata indicating an encryption key of set encryption keys 160 to be used to decrypt the respective encrypted buffer or encrypted data contained in the respective buffer.

NIC 150 may receive (e.g., from another computing device in the network) encrypted buffers or encrypted data. Based on the metadata accompanying each of the encrypted buffers or encrypted data, NIC 150 may determine an encryption key of set of encryption keys 160 to be used to decrypt the respective encrypted buffer or encrypted data, and decrypt the respective encrypted buffer or encrypted data using the respective encryption key. After decryption, NIC 150 may determine, based on association data 170 and/or set of instructions 180, whether or not an active buffer (e.g., a buffer to receive the data) is associated with respective encryption key. If it is determined that the active buffer is associated with the respective encryption key, NIC 150 may proceed with normal execution of the decrypted buffer or decrypted data. If it is determined that the active buffer is not associated with the respective encryption key, NIC 150 may drop the decrypted buffer or decrypted data.

Figure 4:
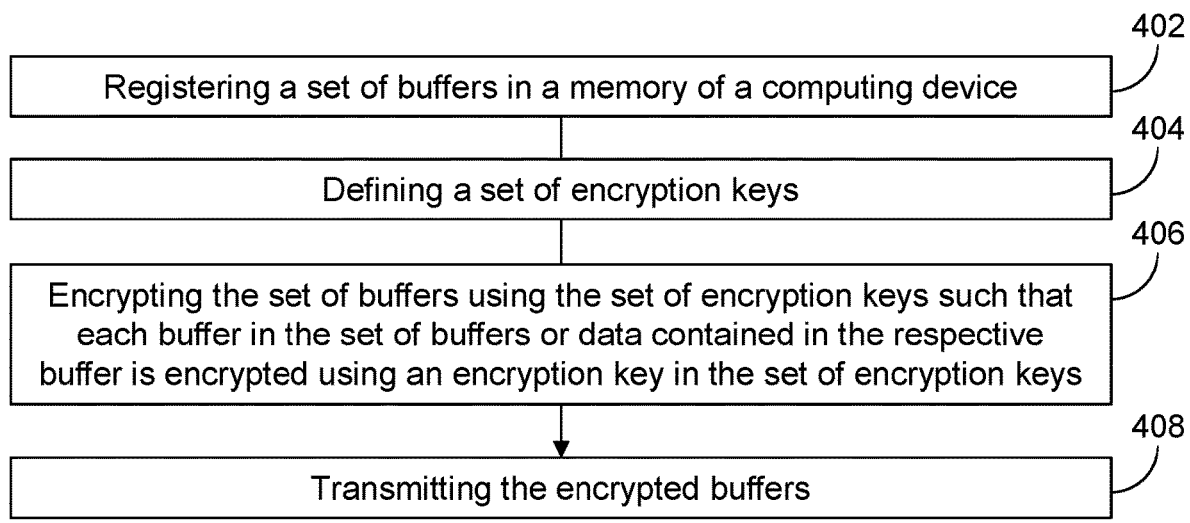
FIG. 4 is a flowchart of a method of encrypting a memory transaction, according to some embodiments of the present invention.

Reference is now made to FIG. 4, which is a flowchart of a method of encrypting a memory transaction, according to some embodiments of the present invention.

The method may be performed using a computing device, such as MC described above with respect to FIG. 1, but other systems may be used.

In operation 402, a set of buffers may be registered in a memory 120 of a computing device (e.g., set of buffers 122 described above with respect to FIGS. 1 and 2). In operation 404, a set of encryption keys may be defined (e.g., set of encryption keys 160 described above with respect to FIGS. 1 and 2). In some embodiments, each encryption key in the set of encryption keys may be different from the other encryption keys in the set of encryption keys. In operation 406, the set of buffers or data contained in the buffers may be encrypted using the set of encryption keys such that each buffer in the set of buffers or data contained in the respective buffer is encrypted using an encryption key in the set of encryption keys. In operation 408, the encrypted buffers or data contained in the buffers may be transmitted, e.g., to another computer device (e.g., as described above with respect to FIGS. 1-3).

In some embodiments, association data may be generated, the association data may associate each of one or more of encryption keys in the set of encryption keys with one buffer in the set of buffers (e.g., association data 170 described above with respect to FIGS. 1 and 2). In some embodiments, a set of instructions may be defined, the set of instructions may indicate an order of buffers in the set of buffers to be transmitted (e.g., set of instructions 180 described above with respect to FIGS. 1 and 3). In some embodiments, each buffer in the set of buffers or data contained in the respective buffer may be encrypted according to the set of instructions using an encryption key in the set of encryption keys associated with the respective buffer (e.g., as described above with respect to FIGS. 1-3).

It may be determined, based on the association data and/or the set of instructions, whether or not an active encryption key (e.g., an encryption key to be used) is associated with a buffer to be transmitted. If it is determined that the active encryption key is associated with the buffer to be transmitted, the respective buffer or data contained in the respective buffer may be encrypted using the active encryption key and the encrypted buffer or the encrypted data from the respective buffer may be transmitted (e.g., as described above with respect to FIGS. 1-3). If it is determined that the active encryption key is not associated with the buffer to be transmitted, the active encryption key may be set to an encryption key that is associated with the respective buffer (e.g., based on the association data and/or the set of instructions), the respective buffer or data contained in the respective buffer may be encrypted using the newly set active encryption key, and the encrypted buffer or the encrypted data from the respective buffer may be transmitted (e.g., as described above with respect to FIGS. 1-3).

Each of the encrypted buffers or encrypted data may be transmitted together with metadata indicating an encryption key of the set encryption keys to be used to decrypt the respective encrypted buffer or encrypted data contained in the respective buffer (e.g., as described above with respect to FIGS. 1-3).

Encrypted buffers or encrypted data may be received. Based on the metadata accompanying each of the encrypted buffers or encrypted data, an encryption key of the set of encryption keys to be used to decrypt the respective encrypted buffer or encrypted data may be determined, and the respective encrypted buffer or encrypted data may be decrypted using the respective encryption key (e.g., as described above with respect to FIGS. 1-3). After decryption, it may be determined, based on the association data and/or the set of instructions, whether or not an active buffer (e.g., a buffer to receive the data) is associated with respective encryption key. If it is determined that the active buffer is associated with the respective encryption key, the decrypted buffer or decrypted data may be executed (e.g., as described above with respect to FIGS. 1-3). If it is determined that the active buffer is not associated with the respective encryption key, the decrypted buffer or decrypted data may be dropped (e.g., as described above with respect to FIGS. 1-3).

Advantageously, embodiments of the present invention may encrypt a set of buffers to be transmitted in a memory transaction such that each buffer of the set of buffers is encrypted using an encryption key of a set of encryption keys, thus enhancing security of data being transmitted in the memory transaction as compared to current memory transaction encryption methods.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The invention claimed is:

1. A method of encrypting a memory transaction, the method comprising, using a computing device operating a processor:
  defining a set of instructions indicating an order of buffers in a set of buffers to be transmitted, the set of instructions comprising:
    a set of pointers, each pointer to a buffer in the set of buffers, and
    a set of indexes, each index to an encryption key in a set of encryption keys;
  based on the set of instructions, encrypting the set of buffers to be transmitted, each buffer encrypted using an encryption key of the set of encryption keys; and
  transmitting the encrypted buffers.

2. The method of claim 1, comprising transmitting the encrypted buffers.

3. The method of claim 1, comprising:
  associating each of one or more of encryption keys in the set of encryption keys with a buffer in the set of buffers; and
  encrypting a buffer in the set of buffers using the encryption key of the set of encryption keys associated with the respective buffer.

4. The method of claim 1, comprising defining the set of instructions such that each index of the set of indexes is followed by a pointer of the set of pointers.

5. The method of claim 1, wherein each encryption key in the set of encryption keys is different from the other encryption keys in the set of encryption keys.

6. The method of claim 1, comprising:
  associating each of one or more of encryption keys in the set of encryption keys with a buffer in the set of buffers;
  based on the association, determining whether or not an encryption key in the set of encryption keys is associated with a buffer in the set of buffers; and
  upon determination that the encryption key is associated with the buffer, encrypting the buffer using the encryption key.

7. The method of claim 1, comprising:
  receiving the encrypted buffers;
  based on metadata accompanying the encrypted buffers, determining encryption keys of the set of encryption keys to be used to decrypt the encrypted buffers; and
  decrypting the encrypted buffers using the encryption keys.

8. A device comprising:
  a memory; and
  a processor to:
    encrypt a set of buffers to be transmitted, each buffer encrypted using an encryption key of a set of encryption keys;

associate each of one or more of encryption keys in the set of encryption keys with a buffer in the set of buffers;

based on the association, determine whether or not an encryption key in the set of encryption keys is associated with a buffer in the set of buffers; and upon determination that the encryption key is associated with the buffer, encrypt the buffer using the encryption key.

9. The device of claim 8, wherein the processor to transmit the encrypted buffers.

10. The device of claim 8, wherein the processor to:
define a set of instructions indicating an order of buffers in the set of buffers to be transmitted; and
based on the set of instructions, encrypt the buffers and transmit the encrypted buffers.

11. The device of claim 10, wherein the set of instructions comprises:
a set of pointers, each pointer to a buffer in the set of buffers, and
a set of indexes, each index to an encryption key in the set of encryption keys.

12. The device of claim 11, wherein the processor to define the set of instructions such that each index of the set of indexes is followed by one pointer of the set of pointers.

13. The device of claim 8, wherein each encryption key in the set of encryption keys is different from the other encryption keys in the set of encryption keys.

14. The device of claim 8, wherein the processor to:
receive the encrypted buffers;
based on metadata accompanying the encrypted buffers, determine encryption keys of the set of encryption keys to be used to decrypt the encrypted buffers; and
decrypt the encrypted buffers using the encryption keys.

15. A method of encrypting a memory transaction, the method comprising, using a computing device operating a processor:
associating each of one or more of encryption keys in a set of encryption keys with one buffer in a set of buffers;
encrypting a buffer of the set of buffers using the encryption key of the set of encryption keys associated with the buffer;
receiving the encrypted buffer;
based on metadata accompanying the encrypted buffer, determining an encryption key of the set of encryption keys to be used to decrypt the encrypted buffer; and
decrypt the encrypted buffer using the encryption keys.

16. The method of claim 15, comprising transmitting the encrypted buffer.

* * * * *